United States Patent
Meyer et al.

(10) Patent No.: US 8,219,867 B2
(45) Date of Patent: Jul. 10, 2012

(54) FORWARD FEEDBACK FOR UL MACRODIVERSITY

(75) Inventors: Michael Meyer, Aachen (DE); Henning Wiemann, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 824 days.

(21) Appl. No.: 12/064,533

(22) PCT Filed: Aug. 24, 2005

(86) PCT No.: PCT/EP2005/009142
§ 371 (c)(1),
(2), (4) Date: Nov. 13, 2008

(87) PCT Pub. No.: WO2007/022792
PCT Pub. Date: Mar. 1, 2007

(65) Prior Publication Data
US 2009/0222704 A1    Sep. 3, 2009

(51) Int. Cl.
*H04L 1/18* (2006.01)
(52) U.S. Cl. .......................... 714/748; 714/750
(58) Field of Classification Search .......... 714/748, 714/750
See application file for complete search history.

(56) References Cited

U.S. PATENT DOCUMENTS

| | | | |
|---|---|---|---|
| 5,701,311 A | 12/1997 | Kapoor et al. | |
| 6,081,568 A * | 6/2000 | Oda | 375/358 |
| 6,085,108 A | 7/2000 | Knutsson | |
| 6,389,568 B1 * | 5/2002 | Leshay et al. | 714/749 |
| 6,567,388 B1 | 5/2003 | Tomcik et al. | |
| 6,920,598 B2 * | 7/2005 | Chen et al. | 714/748 |
| 7,185,256 B2 * | 2/2007 | Miki et al. | 714/751 |
| 7,266,608 B2 * | 9/2007 | Ishida et al. | 709/227 |
| 7,334,176 B2 * | 2/2008 | Schroder | 714/750 |
| 7,673,211 B2 * | 3/2010 | Meyer et al. | 714/748 |
| 2005/0201337 A1 | 9/2005 | Heo | |
| 2010/0115368 A1 * | 5/2010 | Terry et al. | 714/748 |

FOREIGN PATENT DOCUMENTS

| | | |
|---|---|---|
| EP | 0 682 425 A2 | 11/1995 |
| EP | 0682 425 | 11/1995 |
| EP | 1187 386 | 3/2002 |
| JP | A 2002-511210 | 4/2002 |
| JP | A 2004- 248299 | 9/2004 |
| WO | WO 00/52873 A2 | 9/2000 |

\* cited by examiner

*Primary Examiner* — Yolanda L Wilson (57) ABSTRACT

A method of controlling a data unit transmission from a sender to a receiver is described, comprising the steps: the sender sending a data unit to the receiver, the receiver sending to the sender a feedback message comprising receipt status information for the data unit indicating one of at least correct receipt and incorrect receipt, the sender, subsequent to receiving the feedback message, sending to the receiver feedback response information indicating a receipt status indicated in the received feedback message.

42 Claims, 9 Drawing Sheets

FORWARD FEEDBACK FOR UL MACRODIVERSITY

FIELD OF THE INVENTION

The present invention relates to the field of data unit communication between a sender and a receiver, to methods of controlling a sender and a receiver, and to correspondingly arranged senders and receivers.

BACKGROUND OF THE INVENTION

In the field of data unit communication it is known to control a data unit transmission from a sender to a receiver in such a way that the sender sends one or more data units to the receiver, and that the receiver sends back to the sender one or more corresponding feedback messages that comprise receipt status information. The receipt status information can e.g. indicate correct receipt or incorrect receipt, where incorrect receipt can cover both receipt with irreparable errors or no receipt at all. Examples are the sending of well-known acknowledgment messages (ACK) or negative acknowledgment messages (NACK).

A problem that can occur is that the feedback messages can be susceptible to errors. This can lead to the effect that the receipt status information in the feedback message is changed, such that the sender is not properly informed of the receipt status at the receiver. An envisionable solution to this problem consists in coding the receipt status information in such a way that it becomes sufficiently error resistant, e.g. by adding redundancy.

OBJECT OF THE INVENTION

The object of the present invention is to provide an improved method of controlling a data unit transmission from a sender to a receiver, as well as improved control methods for senders and receivers, and correspondingly improved senders and receivers.

SUMMARY OF THE INVENTION

The object of the present invention is achieved by the methods and devices described in the independent claims. Preferred embodiments are described in the dependent claims.

In accordance with an embodiment of the present invention, the sender is arranged such that subsequent to receiving a feedback message that comprises receipt status information, feedback response information is sent to the receiver, where the feedback response information indicates the receipt status indicated in the received feedback message. In other words, the sender determines the receipt status indicated in the feedback message and then sends an indication thereof back to the receiver. For example, if the receiver sends ACKs or NACKs then the sender sends to the receiver feedback response information that indicates whether an ACK or a NACK was received.

By virtue of this concept, the receiver can keep track of whether or not the feedback messages are correctly arriving at the sender. The receiver can make use of this information in any suitable or desirable way. For example, the information can be kept for purely statistical purposes. Preferably, the receiver performs a determination of whether the receipt status information for a given data unit and the feedback response information provided by the sender for the same given data unit indicate the same receipt status. Based on this determination, it can be assessed whether the sender has been correctly informed of the receipt status or not. The result of this determination can be put to different uses.

For example, when considering the general case that the sender sends a sequence of several data units to the receiver, the receiver can monitor the number of incidents in which the receipt status information and the feedback response information do not indicate the same receipt status, to use this number as a basis for making the feedback messages more resistant against errors, e.g. by improving the coding or increasing the signal strength.

According to a preferred embodiment, if the receiver determines that the feedback response information and the receipt status information do not indicate the same receipt status, then an error indication is sent as an error response procedure. In response to receiving the error indication, the sender can e.g. conduct a retransmission of the data unit in question, if necessary. For example, if the receipt status information at the receiver indicates an incorrect receipt, whereas the feedback response information indicates correct receipt, which means that the information in the feedback message was changed from indicating incorrect receipt to indicating correct receipt, then it is preferred that the sender retransmits the data unit in question. Namely, in this case the data unit has not been correctly received at the receiver, but the feedback message arriving at the sender indicates correct receipt, such that the sender is under the impression that the data unit was correctly delivered.

It is noted that in the embodiments of the present invention, the feedback response information can be sent to the receiver in any suitable or desirable way, e.g. in a data unit such as a dedicated feedback response message or in a further data unit of a sequence being transmitted, or the feedback response information could also be sent over a signalling path separate from the connection used for transmitting data units.

Based on the present invention, an improved control with respect to the data unit transmission from sender to receiver is provided, as errors in feedback messages can be detected and possibly counteracted.

According to a preferred embodiment, the concept of the present invention is applied in the context of a macro-diversity transmission from a sender to a plurality of receivers.

BRIEF DESCRIPTION OF FIGURES

The concepts and advantages of the present invention will become easier to understand from the following description of detailed embodiments, where reference is made to the drawings, in which.

DETAILED DESCRIPTION OF EMBODIMENTS

Figure 1:
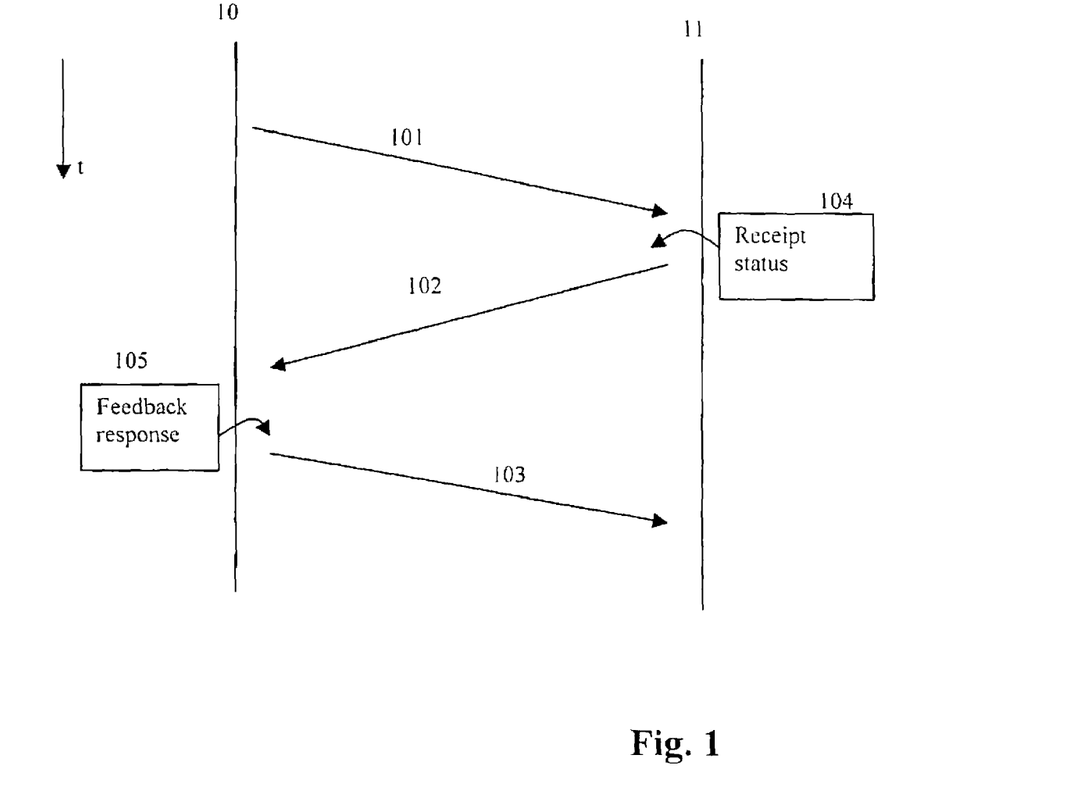
FIG. 1 shows an exchange of information between a sender and receiver in accordance with an embodiment of the present invention.

FIG. 1 shows a first basic embodiment of the present invention, where reference numeral 10 belongs to a sender and reference numeral 11 to a receiver. Initially the sender sends a data unit 101 to the receiver 11. The receiver 11 determines the receipt status and correspondingly provides receipt status information 104. The receipt status information can be provided in any suitable or desirable way, but at least indicates correct receipt or incorrect receipt. The determination whether receipt is correct or not can be made in any known way, e.g. by examining information added to the data unit 101 for allowing to check whether the data unit has been corrupted, such as cyclic redundancy check information or the like. It is noted that an incorrect receipt comprises the cases of receiving a data unit that has incorrectable errors, or not receiving the data unit at all.

The receiver 11 sends a feedback message 102 to sender 10. The feedback message 102 comprises the receipt status information 104 for the data unit 101.

It may be noted in this connection that the sending of the feedback message 102 is not necessarily triggered by the receipt of data unit 101, although it can be. It is for example possible that the data unit 101 is among a sequence of data units being sent from the sender 10 to the receiver 11, and the receiver 11 sends feedback messages to sender 10 whenever receiving one of the data units from the sequence, where the feedback messages provide information on other data units than the one received. An example of this is the generation of cumulative acknowledgment messages. It is also possible that the receiver is arranged to send the receipt status information regularly, even if no data units at all arrive. However, it is preferred that the receiver 11 sends a feedback message 102 in response to receiving the data unit 101, where the feedback message 102 comprises receipt status information related to data unit 101.

The feedback message 102 can e.g. be an acknowledgment (ACK) indicating correct receipt or a non-acknowledgment (NACK) indicating incorrect receipt. The receipt status information 104 can be coded into the feedback message in any suitable or desirable way, e.g. as a single bit in the simplest case, where one bit value indicates correct receipt and the other bit value incorrect receipt. The coding can naturally also be more elaborate, especially if the receipt status information conveys more than just correct or incorrect receipt, e.g. if the receipt status information indicates a certain degree of error in the received data unit and/or the position of the error.

In the example of FIG. 1, subsequent to receiving the feedback message 102, the sender 10 determines the receipt status indicated in the received feedback message 102 and then sends corresponding feedback response information 105 to the receiver 11. The feedback response information 105 indicates the receipt status provided by the received feedback message 102. For example, if the sender 10 reads from feedback message 102 a receipt status of correct receipt, then the feedback response information 105 indicates correct receipt.

The feedback response information 105 can be provided to receiver 11 in any suitable or desirable way, e.g. as part of a data unit, such as the data unit 103 shown in FIG. 1, or via a signalling path separate from the path over which data units are being transmitted.

The feedback response information 105 can be provided in exactly the same way as the receipt status information 104, i.e. can have the same coding. Preferably, in order to avoid that the feedback response information 105 is damaged by errors that might have afflicted the feedback message 102, the feedback response information 105 is sent in such a way as to be more resistant against transmission errors than the receipt status information 104. This can e.g. be achieved by a coding that is more resistant against transmission errors, or by increasing the signal strength with respect to the signal strength with which feedback message 102 is sent. Furthermore, in order to increase the likelihood that the feedback response information 105 is received correctly at receiver 11, the feedback response information 105 can be sent repeatedly, e.g. a predetermined number of times.

Figure 3:
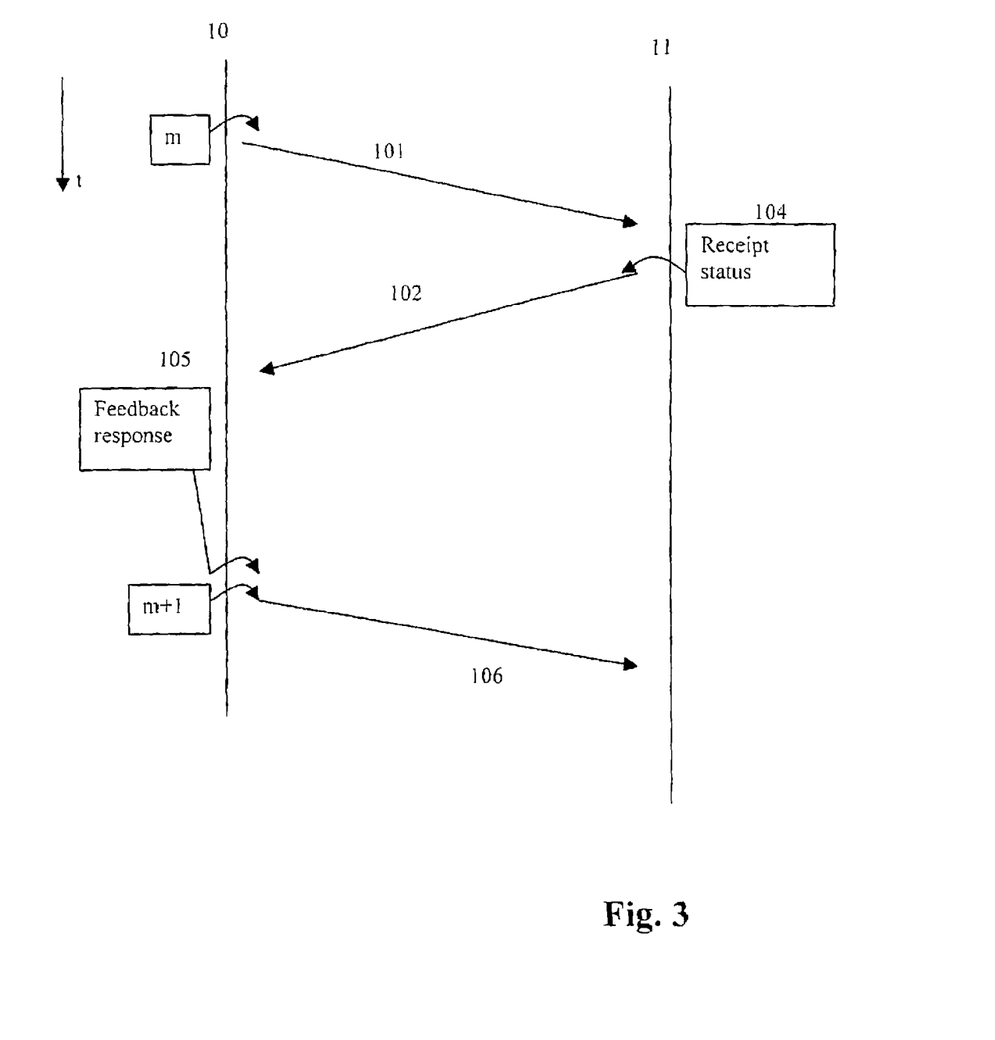
FIG. 3 shows an exchange of information between a sender and a receiver in accordance with a further embodiment of the present invention.

The feedback response information 105 can be sent in a message 103, as shown in FIG. 1. The message 103 can e.g. be a dedicated feedback response message that is sent in response to receiving the feedback message 102. However, as shown in FIG. 3, it is also possible that the feedback response information 105 is sent in a data unit out of a sequence to which data unit 101 belongs. More specifically, the sender 10 will typically have a sequence of data units . . . , m, m+1, . . . of data units to be sent. Each data unit carries a segment of an overall data amount. In the example of FIG. 3, data unit 101 relates to the m-th data unit, and the feedback response information 105 is sent in a data unit 106 that is associated with the m+1-th data unit of the sequence. The sending of the m+1-th data unit 106 may occur in response to receiving feedback message 102, or may be triggered by some other result of the flow control procedure conducted by sender 10. The feedback response information 105 can be sent in any data unit that is transmitted subsequent to receiving the feedback response message 102, namely in a data unit further on in the sequence (such as the data unit m+1), in a retransmission of the given data unit m or in the retransmission of a preceding data unit having a smaller sequence position identifier than m.

The sending within a data unit can be done in any suitable or desirable way. The feedback response information can be placed in the header or the payload of a data unit. It can e.g. be a single bit indicating correct receipt or incorrect receipt, or it can be a bitmap comprising a predetermined number of bits. A particularly advantageous way of placing the feedback response information into a data unit is if the information is added to the data unit section that is redundancy coded, e.g. CRC coded. In that way a reliable transmission of the feedback response information can be provided with simple means. In the above example, in which the feedback response information is sent in a data unit of a sequence, if the data units use CRC coding for the payload section, the feedback response information may e.g. be added to the payload section.

According to a further embodiment, the feedback response information 105 for the given data unit 101 can also be sent together with feedback response information for other data units of the sequence. In other words, it is possible to implement the concept of the invention in such a way that feedback response information reports that contain information associated with a plurality of data units are sent.

Figure 2:
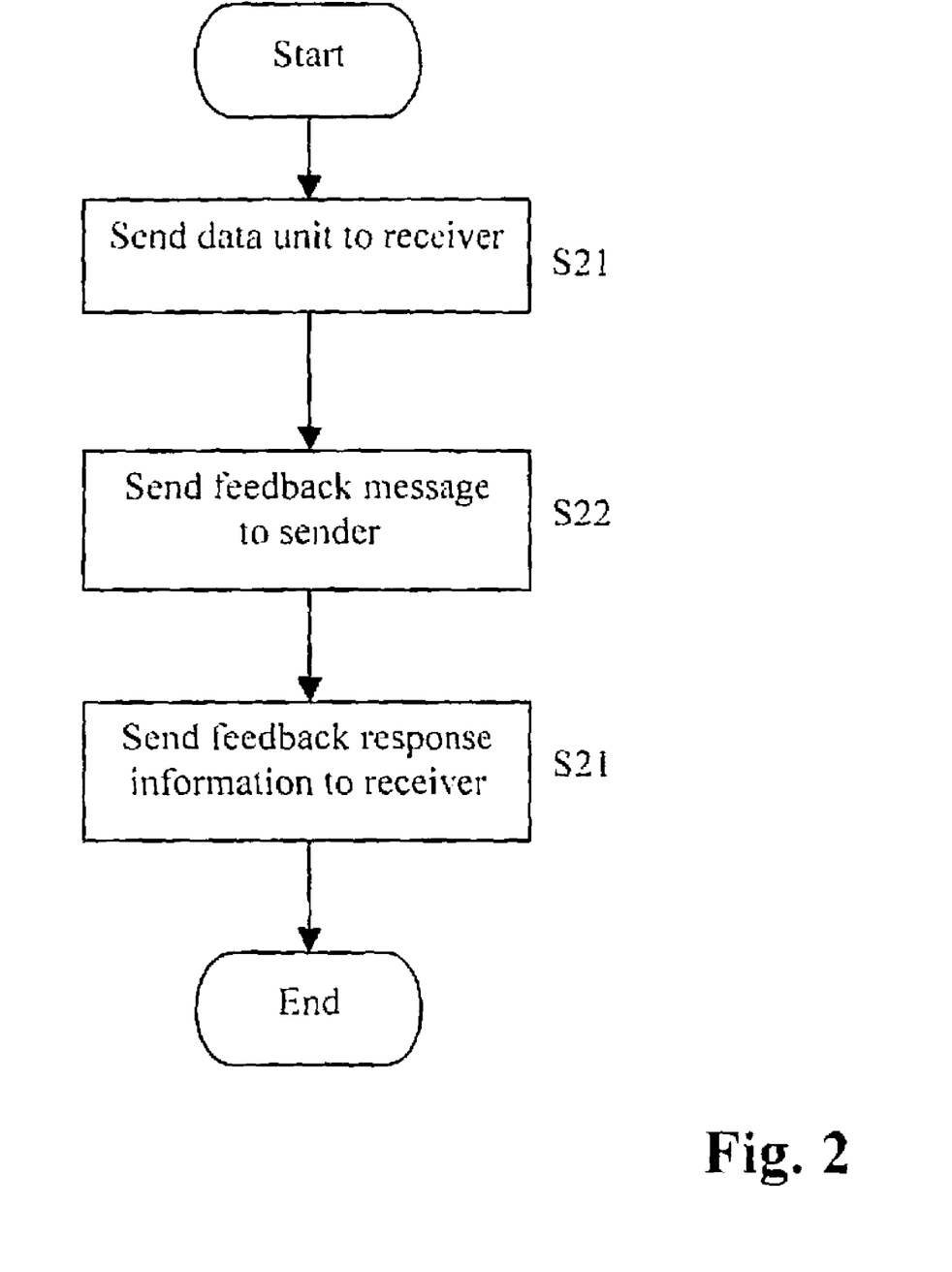
FIG. 2 shows a flowchart of an embodiment of the present invention.

FIG. 2 shows a flow chart of a method embodiment of the present invention. In a first step S21 the sender sends a data unit to the receiver. In step S22 the receiver sends the feedback message to the sender, and in step S23 the sender sends the feedback response information to the receiver.

Figure 5:
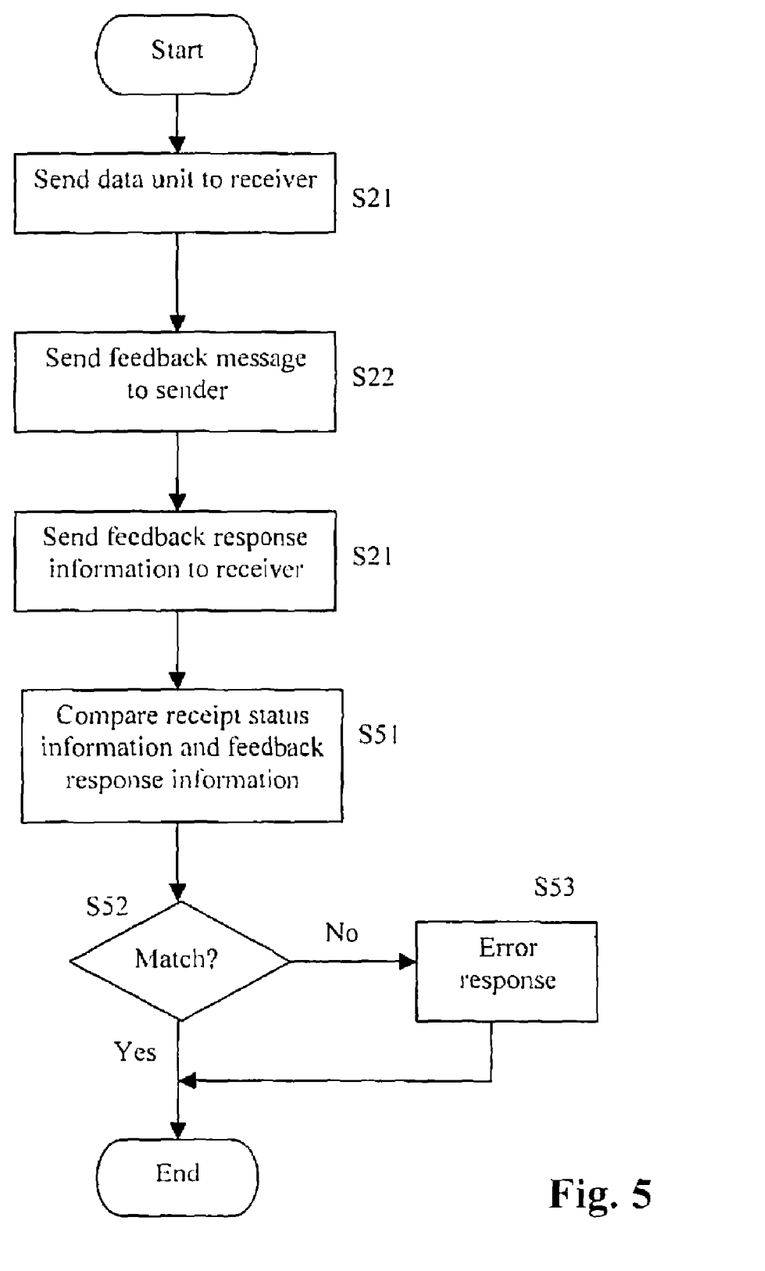
FIG. 5 shows a flowchart of another embodiment of the present invention.

The receiver 11 can use the feedback response information 105 in any suitable or desirable way. For example, the information can simply be collected for statistical purposes. However, it is preferable that the receiver, subsequent to receiving the feedback response information determines whether the receipt status information 104 and the feedback response information 105 indicate the same receipt status. This is shown in FIG. 5, which is a flow chart including steps S21-S23 already described in connection with FIG. 2, such that a renewed description of these steps is not necessary. In FIG. 5, subsequent to step S23, step S51 compares the receipt status information and the feedback response information. Then it is determined in step S52 whether they match. In the example of FIG. 5, a mismatch, i.e. if the receipt status information 104 and the feedback response information 105 do not indicate the same receipt status, leads to the receiver 11 conducting an error response procedure S53. The error response procedure is not in necessity, as the comparison information could also be kept for statistical purposes i.e. to assess how many errors in the feedback messages occur. However, it is preferred to conduct the error response procedure S53, which can be chosen in any suitable or desirable way. For example, the error response procedure can consist in adapting the error coding in future feedback messages in accordance with the number of mismatches between the receipt status information and the feedback response information. For example, if the number of mismatches exceeds a predetermined threshold, the coding or transmission power can be adjusted such that the feedback messages are less susceptible to errors.

Figure 4:
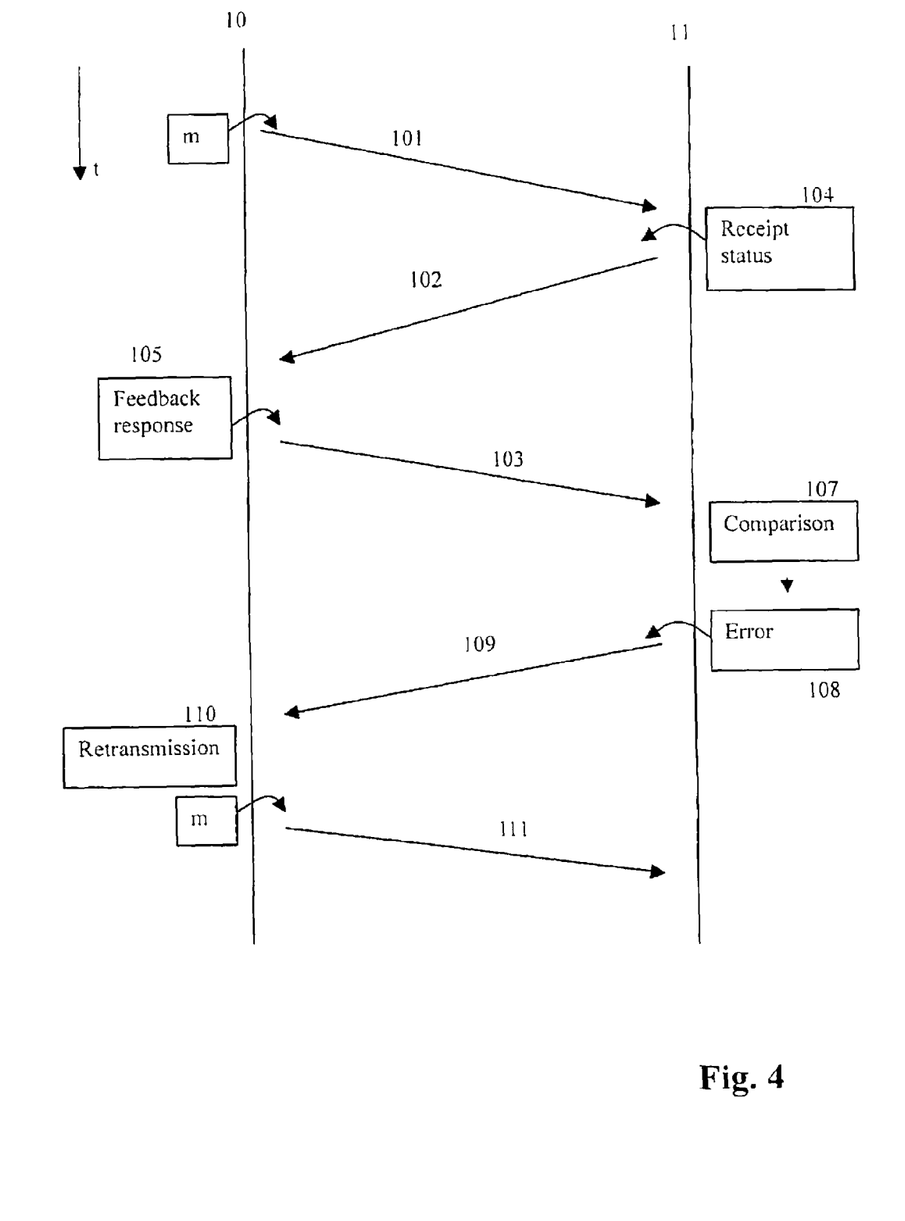
FIG. 4 shows an exchange of information between a sender and a receiver in accordance with yet a further embodiment of the present invention.

Another example of an error response procedure is the sending of an error message to the sender 10. This will be explained in connection with FIG. 4, which uses the same reference numerals as FIG. 1, such that a repetition of the elements of FIG. 1 is not necessary. In FIG. 4, after having received the feedback response message 103 comprising the feedback response information 105, receiver 11 conducts a comparison 107, and in the example of FIG. 4 it is assumed that an error is detected, i.e. that the feedback response information 105 and the receipt status information 104 do not indicate the same receipt status. An error indication 108 is sent to the sender 10, e.g. in a message 109. The message 109 can e.g. be a feedback message for a different data unit than the m-th data unit 101 associated with the receipt status information 104 and the feedback response information 105. The message 109 could also be a dedicated error message. It is furthermore possible to send more than one error indication in one message, e.g. if the transmission relates to a sequence of data units to be sent from the sender to the receiver, then an error indication such as the indication 108 in FIG. 4 can also be sent together with error indications for other data units than the m-th data unit.

Also, in order to increase the probability that the sender 10 correctly receives the error indication 108, the sending of the error indication 108 can be repeated more than once, e.g. a predetermined number of times.

The sender 10 can react to the receipt of the error indication 108 in any suitable or desirable way. For example, it can simply store this information for statistical purposes. Preferably, the sender 10 reacts to the error indication in an appropriate way, e.g. by retransmitting the data unit m associated with the error indication 108. This is shown through retransmission 110 via data unit 111 in FIG. 4.

According to a preferred embodiment the sender and receiver are arranged such that a retransmission occurs if the comparison 107 shows that the receipt status information 104 indicates incorrect receipt and the feedback response information 105 indicates correct receipt. Namely, in this case, the data unit 101 was not correctly received at receiver 11, but through an error in feedback message 102, the sender considers it to be correctly received. It is therefore desirable that retransmission of the m-th data unit sent in data unit 101 is performed. This goal can be achieved in different ways. For example, the receiver 11 can be arranged in such a way that the comparison result is conveyed by the error indication 108. Then the sender 10 can read the error indication, determine the specific mismatch and then trigger a retransmission of the m-th data unit in transmission 111. Alternatively, it is possible to arrange the receiver 11 in such a way that only one type of error indication is sent, and that it is only sent if the result of comparison 107 shows that the receipt status information 104 indicates incorrect receipt and the feedback response information 105 indicates correct receipt. The sender 10 can then be arranged such that whenever it receives an error indication, it performs a retransmission.

In this context it is also noted that the error indication may or may not explicitly identify the sequence position identifier of the data unit for which comparison 107 led to an error indication, e.g. m in FIG. 4. If the error indication 108 contains the sequence position identifier, then the appropriate retransmission is straight-forward. However, the error indication 108 can also be a simple binary signal indicating an error, and the sender 10 simply retransmits the last sent data unit. The latter alternative may lead to less reliability than the former alternative, but absolute reliability is not always required or desired. For example, if the sender 10 and receiver 11 are peers of a given protocol layer, such as the link layer, and if higher layer protocols tolerate a certain data loss rate, then absolute reliability is not necessary. As an example, the sender 10 and receiver 11 are link layer peers, and if a higher layer runs TCP, then a data loss rate of $10^{-6}$ can well be acceptable, and if e.g. voice over IP applications are being run, then a data loss rate of even $10^{-3}$ is acceptable. If the mean error rate for a misinterpretation of incorrect receipt (e.g. NACK) to correct receipt (e.g. ACK) is $10^{-4}$, and if the embodiment using error indications without sequence position identifiers reduces the loss rate to $10^{-6}$, then this would be sufficient for the above mentioned TCP example, even if full reliability is not achieved.

Figure 6:
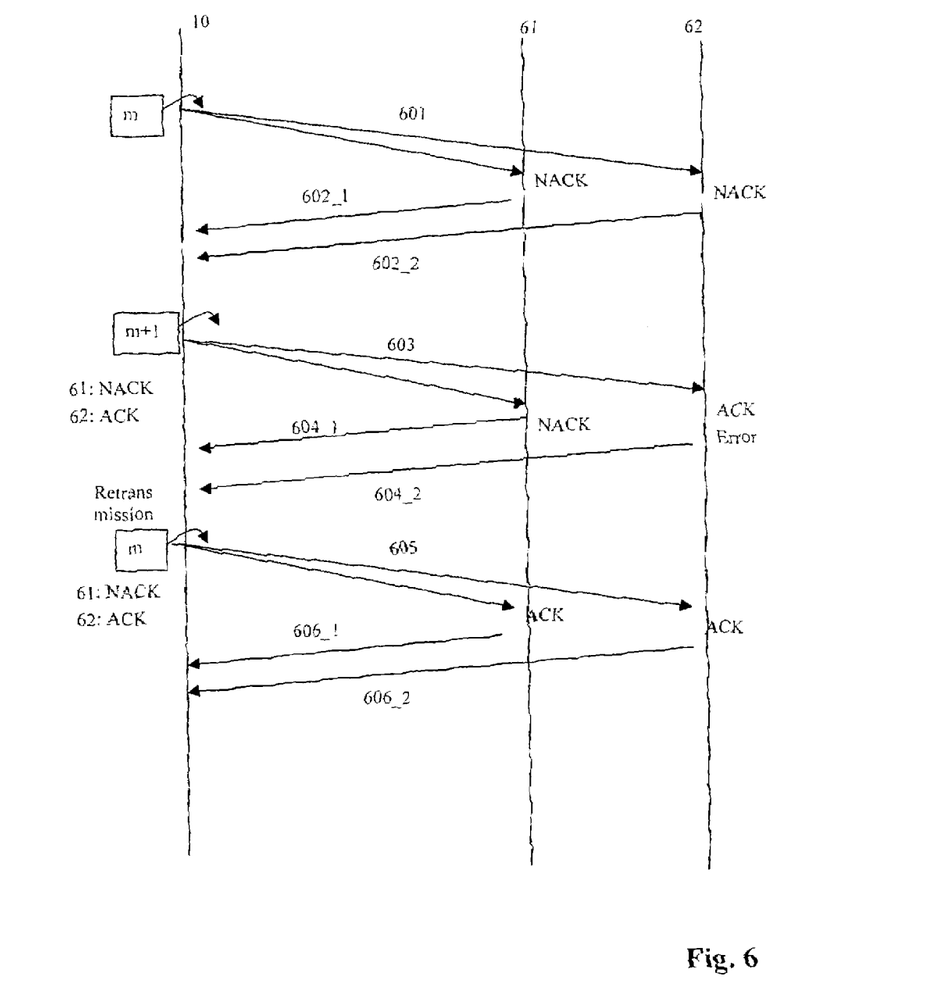
FIG. 6 shows an exchange of information between a sender and a plurality of receivers in a macro-diversity transmission according to a further embodiment of the present invention.

The above-described concepts and embodiments can be particularly well applied in the context of a data unit transmission from one sender to a plurality of receivers. An example of this is shown in FIG. 6, which relates to a macro-diversity transmission from sender 10 to a first receiver 61 and a second receiver 62. The term macro-diversity means that a communication is conducted over at least two different paths, in order to increase the overall transmission quality. Namely, when looking at the example of FIG. 6, if data units are sent from sender 10 to two different receivers 61 and 62, then even if a data unit is lost or damaged on its way on one receiver, there is still the possibility that it correctly arrives at the other.

In the example of FIG. 6, two receivers 61 and 62 are shown. This is only an example, as the communication from one sender to a plurality of receivers can relate to any number n of receivers, where n is an integer larger than one. In an embodiment of the invention, the sender then sends a given data unit, such as data unit 601 in FIG. 6, to each of the plurality of n receivers, i.e. to the receivers 61 and 62 in the example of FIG. 6. For each value of i from 1 to n, the i-th receiver sends to the sender an i-th feedback message, such as the first feedback message 602_1 sent from receiver 61 to sender 10 and the second feedback message 602_2 sent from the second receiver 62 to the sender 10. Each feedback message comprises receipt status information for the data unit indicating one of at least correct receipt and incorrect receipt at the i-th receiver. In the example of FIG. 6, it is assumed that the data unit 601 is incorrectly received both at the first receiver 61 and the second receiver 62, such that the feedback messages 602_1 and 602_2 are NACK messages. In the general case, the sender 10, subsequent to receiving the i-th feedback message will send to the i-th receiver i-th feedback response information indicating a receipt status indicated in the received i-th feedback message. Again looking at the example of FIG. 6, this means that the sender 10 determines from received feedback message 602_1 the indicated receipt status at receiver 61 and from feedback message 602_2 the indicated receipt status at second receiver 62. Feedback response information for each of the plurality of receivers is then respectively generated and sent. As in the previous examples, the sending of the feedback response information can be done in any suitable or desirable way, e.g. via a signalling path different from the path over which data units are being sent.

The i-th feedback response information can be sent to the i-th receiver separately, i.e. each receiver receives its own separate feedback response information in a dedicated communication. According to a preferred embodiment, the sender 10 includes the first to n-th feedback response information in one message that is sent to each of the plurality of receivers. This is shown in the example of FIG. 6, where the feedback response information for the first receiver 61 and second receiver 62 is placed into one data unit 603 sent to both receivers.

More specifically, in the example of FIG. 6 it is assumed that the sender 10 read from feedback message 602_1 a receipt status of incorrect receipt (NACK), while sender 10 read from feedback message 602_2 a receipt status of correct receipt (ACK). In other words, it is assumed that the receipt status at second receiver 62 is in fact incorrect receipt, but that due to an error in the transmission of feedback message 602_2, sender 10 receives the indication that data unit 601 was correctly received at second receiver 62. As a consequence, the feedback response information generated by sender 10 is incorrect receipt for first receiver 61 and correct receipt for second receiver 62, which is indicated as 61: NACK and 62: ACK in FIG. 6.

In the example of FIG. 6, it is assumed that the feedback response information is sent together with the data units of a sequence being sent from sender 10 to receivers 61, 62. Data unit 601 related to the m-th data unit of the sequence, and in the example of FIG. 6 sender 10 reacts to receiving the feedback messages 602_1 and 602_2 by sending the next data unit in the sequence, i.e. the m+1-th data unit 603. The above-mentioned feedback response information is included in data unit 603. The reason for sending the next data unit in the sequence is that a correct receipt was indicated for second receiver 62. Generally, sender 10, subsequent to receiving receipt status information for a given data unit indicating correct receipt at least one of the plurality of receivers, will send a data unit further on in the sequence than the given data unit. For example, if window-based flow control is used, then the receipt of an acknowledgment for a given data unit in the sequence means that one or more data units further on in the sequence can be sent, where this further data units can include the next data unit in the sequence, or can start several data units further down in the sequence, depending on how many data units have already been sent.

Returning to the example of FIG. 6, it is assumed that data unit 603 is incorrectly received at first receiver 61 (NACK) and correctly received at second receiver 62 (ACK).

Furthermore, as each of the generally n receivers preferably performs a comparison of the receipt status information and the feedback response information, second receiver 62 determines that the feedback response information (an ACK) does not match with its received status information (a NACK). This generates an error indication, which is sent together with feedback response message 604_2, which also transports the indication of correct receipt for data unit 603. On the other hand, first receiver 61 sends a feedback message 604_1 that transmits the indication of incorrect receipt (NACK).

Subsequent to receiving the error indication in message 604_2, sender 10 performs a retransmission of the m-th data unit with message 605. The message 605 furthermore comprises the feedback response information generated on the basis of the receipt status indicated in feedback messages 604_1 and 604_2, where in the example of FIG. 6 it is assumed that sender 10 received an indication of incorrect receipt at receiver 61 and correct receipt at sender 62, i.e. 61: NACK and 62: ACK in FIG. 6.

The receivers 61 and 62 then both correctly receive the m-th data unit in communication 605, such that the respective feedback messages 606_1 and 606_2 contain receipt status information indicating correct receipt (ACK). As can be seen in the example, due to the fact that the receipt status information and the feedback response information for the m+1-th data unit sent in communication 603 match, neither first receiver 61 nor second receiver 62 generate an error indication in response to the feedback response information received in data unit 605. The further process can then e.g. continue by sender 10 sending the m+2-th data unit on account of having received an indication of correct receipt for m and m+1.

It is noted that in the example of FIG. 6, just like in the example of FIG. 4, the sender 10 should not immediately purge or delete sent data units from its send buffer after having received an indication of correct receipt for a given data unit. The sender 10, after having received an indication of correct receipt for a given data unit, can e.g. retain said given data unit in its send buffer for a certain amount of time, for example an amount of time calculated on the basis of the measured or averaged roundtrip time involved in the communication between sender 10 and the plurality of receivers. Alternatively, the sender 10 could retain a given data unit in its send buffer until having received a predetermined number of indications of correct receipt at least one of the receivers, e.g. until having received two indications of correct receipt.

In a macro-diversity system of a sender and a plurality of receivers, a situation can occur that the sender receives more than one indication of correct receipt, but one of these indications is based on an error in the communication of the feedback message, i.e. the corresponding data unit was in fact not correctly received at one of the receivers from which the sender receive an indication of correct receipt. In this case it is desired to avoid that an unnecessary retransmission takes place. Such an unnecessary retransmission would occur if the sender simply indicates the perceived correct receipt in its feedback response information, whereupon the receiver in question determines a mismatch and sends an error indication, whereupon the sender performs a retransmission. There are several ways of avoiding this situation.

According to one possibility, the sender, subsequent to receiving receipt status information for a given data unit indicating correct receipt at least a threshold number k of the plurality of n receivers, where k is an integer and $1 < k \leq n$, disabling the sending of any receiver feedback response information related to the receipt status information of the given data unit. In other words, if a threshold number of correct receipt indications is received, it is assumed that at least one receiver indeed correctly received the data unit in question, such that there is no necessity to send any receiver feedback response information for that data unit. This effectively avoids any retransmission. The value of k can e.g. be set to 2.

According to another alternative, the sender 10 includes the first to n-th feedback response information in one message sent to the plurality of n receivers, as described previously. However, the receivers are arranged in such a way that for each value of i from 1 to n, the i-th receiver determines whether the i-th receipt status information indicates incorrect receipt and the i-th feedback response information indicates correct receipt. Furthermore, the i-th receiver examines whether the feedback response information associated with a threshold number j of the other receivers than the i-th receiver indicates incorrect receipt, where j is an integer and $0<j<n$. If the two conditions are fulfilled, i.e. receipt status information indicates incorrect receipt and feedback response information indicates correct receipt (i.e. an error has occurred in the transmission of the feedback message) and if the threshold number j of other receivers indicates incorrect receipt, then an error indication is sent to the sender 10, in order to let the sender 10 perform a retransmission for the data unit in question. In this way, the receiver makes a decision as to whether or not send an error indication. The decision is based on a mismatch in the receipt status from incorrect receipt at the receiver to correct receipt at the sender, and on the number of indications of incorrect receipt received by the sender. For example, j can be chosen to be equal to n−1, which means that a given receiver will only send an error indication if the feedback response information implies that the sender received an indication of correct receipt only from the receiver in question that has determined that an error occurred in the feedback message, such that a retransmission appears to be suitable.

According to another alternative, the decision on whether or not to retransmit is again made in the sender. Namely, the system operates such that for each value of i from 1 to n, if the i-th receipt status information indicates incorrect receipt and the i-th feedback response information indicates correct receipt, the i-th receiver sends an i-th error indication to the sender. The sender then retransmits the given data unit if it receives error indications from all of the receivers for which it sent feedback response information indicating a correct receipt. In other words, if the sender e.g. communicates with four receivers, and receives a feedback of one NACK and three ACKs with respect to a given data unit, it only performs a retransmission if all three of the receivers for which the sender received an ACK provide an error indication.

It is noted that the above description of a macro-diversity embodiment provides significant advantages with respect to the prior art. Macro-diversity is e.g. applied in the field of wireless cellular communication systems. If a terminal is located at a cell boarder, then it may be operated to maintain links to two or more base stations for performing a soft-handover. In the uplink direction the terminal sends data units to the two or more base stations, which belong to the active set of surrounding base station. All base stations belonging to the active set try to receive and decode the received data block. Finally, the base stations report individually the result of their reception back to the terminal. This can for example be done using a protocol that employs the known HARQ (Hybrid ARQ) mechanism over the wireless link. Each base station can send a positive (ACK) or negative acknowledgment (NACK) depending on the outcome of the reception and decoding process. If there is no ACK received at the terminal, the terminal will perform a retransmission. One way that is envisionable to avoid problems due to communication errors is to allow communication between the base stations, but this is costly in terms of introduced latencies and in terms of control signalling. Another envisionable solution consists in providing a second link layer ARQ protocol, such as RLC AM (RLC acknowledged mode) operated on top of the HARQ protocol. Such a second protocol ensures that lost data can be retransmitted, but it introduces complexity.

In contrast thereto, the concept of the present invention is very simple and increases the transmission performance, because problems caused by errors in the feedback messages can be detected and counteracted.

As may be seen from the above description of data exchanges between a sender and one or more receivers, the present invention can also be embodied in the form of a method of controlling a data unit sender, a method of controlling a data unit receiver, and in a corresponding data unit sender or data unit receiver.

Figure 7:
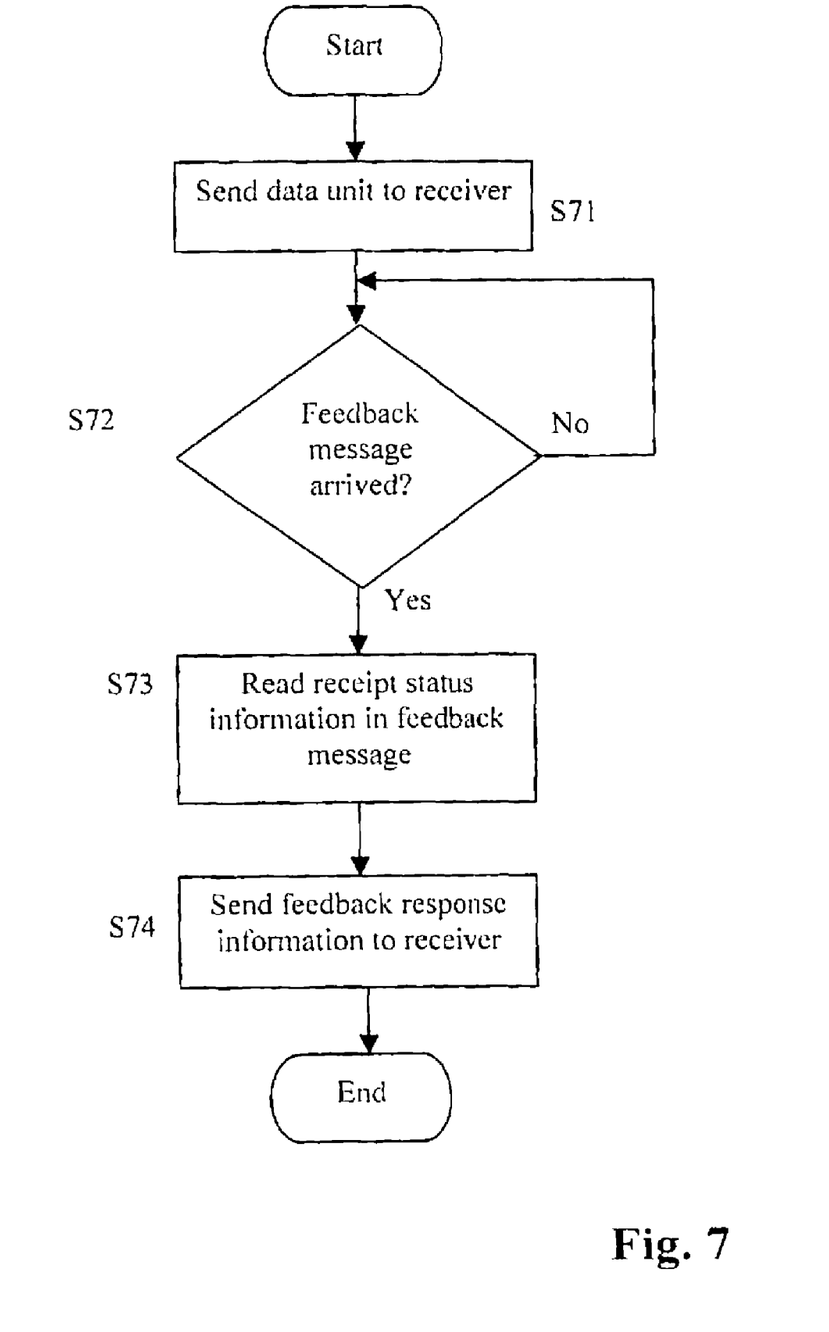
FIG. 7 shows a flowchart of a control method for a sender according to an embodiment of the present invention.

FIG. 7 shows a flow chart of a basic method embodiment for controlling a data unit sender, such as the previously described data unit sender 10 in a communication with one or more receivers, such as the previously described receivers 11, 61 and 62. In step S71 a data unit is sent to the receiver in question, and afterwards, in step S72 it is determined if a feedback message has arrived or not. Subsequent to receiving a feedback message from the receiver, where the feedback message comprises receipt status information for the data unit sent in step S71 and indicating one of at least correct receipt and incorrect receipt, the receipt status information in the received feedback message is read in step S73, and in step S74 feedback response information is sent to the receiver, where said feedback response information indicates the receipt status read in step S73.

Further embodiments of the method of controlling a data unit sender have been described previously with respect to FIGS. 1 to 6 such that a renewed description is not necessary.

Figure 9:
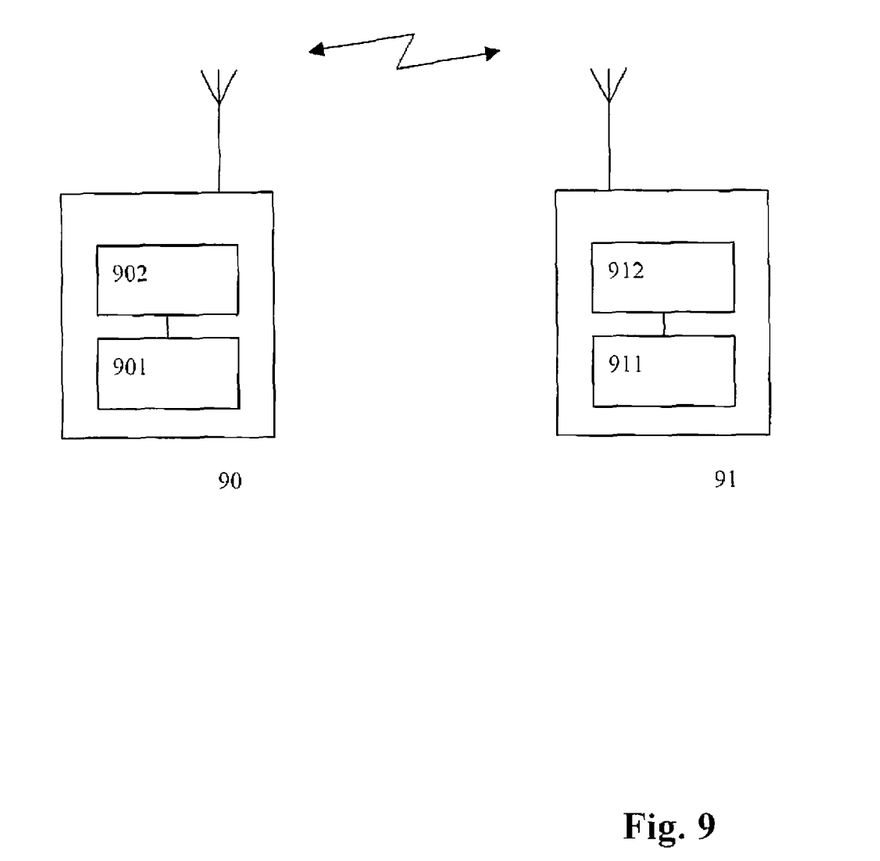
FIG. 9 shows a schematic block diagram of a sender embodiment and a receiver embodiment of the present invention.

The present invention can furthermore be embodied as a data unit sender 90 shown in FIG. 9 for transmitting a data unit to a receiver 91. The data unit sender 90 can e.g. be a wireless terminal in cellular communications system, and the receiver 91 can be a corresponding base station. The data unit sender 90 of FIG. 9 comprises a control system that can e.g. be provided by a processor 901 and a memory 902. The data unit sender 90 also comprises further conventional elements of a sending device, which are well-known to the skilled person, such that a detailed description is not necessary. The control system 901, 902 is arranged for sending a data unit to the receiver 91, and arranged such that subsequent to receiving a feedback message from the receiver, a feedback response information indicating a receipt status indicated in the received feedback message is sent to the receiver. The control system can be implemented in any suitable or desirable way, as hardware, software or any suitable combination of hardware and software. It is furthermore noted that the present invention can also be embodied as a computer program product comprising a computer program that executes one of the above described methods of controlling a data unit sender when loaded into and run on a programmable data unit sending device.

Figure 8:
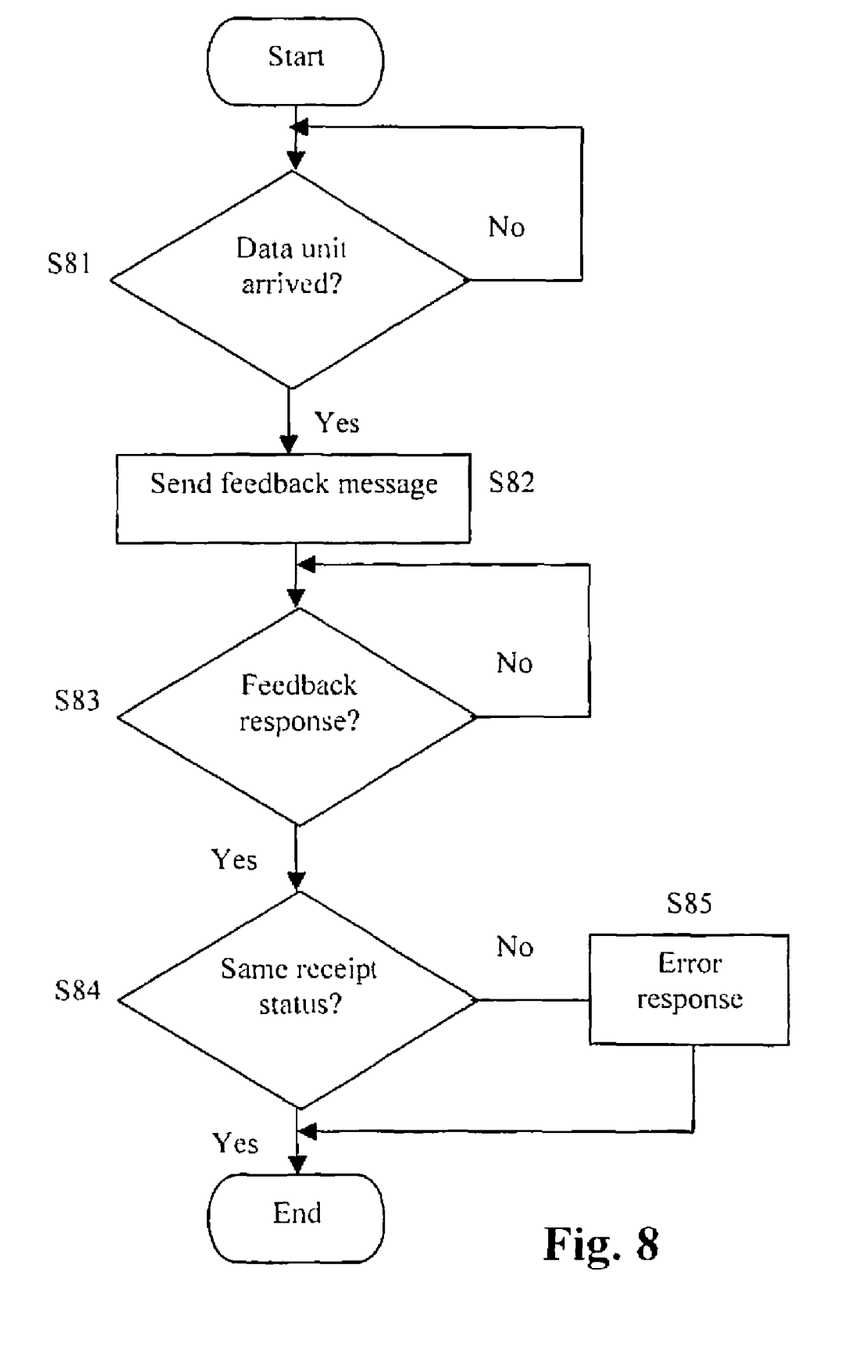
FIG. 8 shows a flowchart of a control method for a receiver according to an embodiment of the present invention.

The present invention can furthermore be embodied as a method of controlling a data unit receiver, such as the receiver 11 described earlier, in a transmission of a data unit from a sender, such as sender 10, to said receiver. An example of such a control method is shown in the flow chart of FIG. 8. Initially, the receiver determines in step S81 whether a data unit has been received. Subsequent to receiving a data unit, step S82 sends to the sender a feedback message comprising receipt status information for the data unit, where the receipt status information indicates one of at least correct receipt and incorrect receipt. Afterwards, in step S83, the receiver waits for a feedback response. Subsequent to receiving the feedback response information from the sender, it is determined whether the feedback response information and the receipt status information sent in step S82 in the feedback message indicate the same receipt status. If not, an error response procedure is conducted in step S815.

Further embodiments of a control method for a data unit receiver have been described above, such that a renewed description is not necessary.

Referring to FIG. 9, it can be seen that the present invention can also be embodied as a data unit receiver 91 for receiving a data unit from a sender 90. The data unit receiver 91 comprises a control system that may e.g. consist of a processor 911 and a memory 912. The data unit receiver 91 comprises further conventional receiver elements and parts well known to a skilled person, such that a further description is not necessary. The control system 911, 912 is arranged for sending to the sender 90 a feedback message comprising receipt status information for the received data unit, where the received status information indicates one of at least correct receipt and incorrect receipt. The control system is furthermore arranged such that, subsequent to receiving from the sender feedback response information indicating a receipt status indicated in the feedback message as received by the sender, it is determined whether the receipt status information and the feedback response information indicate the same receipt status. The control system can be implemented in any suitable or desirable way, as hardware, software or any suitable combination of hardware and software.

The present invention may furthermore be embodied as a computer program product comprising a computer program that executes a control method for a data unit receiver when loaded into and run on a programmable data unit receiving device.

It is particularly preferred to apply the concept of the invention to a sender and one or more receivers which are respectively a sending peer and receiving peers of a link layer protocol, such as HARQ. Namely, it is more efficient to monitor and correct transmission errors at the link layer than at higher layers, such as the network or transport layer. For example it is preferable to conduct retransmissions at the link layer in case of non-congestion related data losses, because e.g. TCP reacts to a data loss by initiating congestion control mechanisms, which can be disadvantageous if the data loss was not due to congestion.

Although the present invention has been described on the basis of detailed and preferred embodiments, these only serve to illustrate the invention and are not intended to be limiting. The scope of protection is defined by the appended claims. Reference numerals in the claims only serve to make the claims easier to read but have no limiting effect.

The invention claimed is:

1. A method of controlling a data unit transmission from a sender to a receiver among a plurality of n receivers involved in a macro-diversity transmission, n being an integer larger than one, comprising the steps of:
said sender sending a data unit to each of said plurality of n receivers,
for each value of i from 1 to n, the i-th receiver sending to said sender an i-th feedback message comprising receipt status information for said data unit indicating one of at least correct receipt and incorrect receipt at the i-th receiver,
said sender, subsequent to receiving said i-th feedback message, sending to said i-th receiver i-th feedback response information indicating a receipt status indicated in said received i-th feedback message.

2. The method of claim 1, wherein said feedback response information is coded to be more resistant against transmission errors than said receipt status information.

3. The method of claim 1, wherein the sending of the feedback response information is repeated more than once.

4. The method of claim 1, wherein said feedback response information is sent in a dedicated feedback response message.

5. The method of claim 1, wherein said data unit is a given data unit among a sequence of data units to be sent from said sender to said receiver, and said feedback response information is sent in a different data unit of said sequence than said given data unit or in a retransmission of said given data unit.

6. The method of claim 1, wherein said data unit is a given data unit among a sequence of data units to be sent from said sender to said receiver, and said feedback response information for said given data unit is sent together with feedback response information for other data units of said sequence.

7. The method of claim 1, wherein said receiver, subsequent to receiving said feedback response information, determines whether said receipt status information and said feedback response information indicate the same receipt status.

8. The method of claim 7, wherein if said receipt status information and said feedback response information do not indicate the same receipt status, said receiver conducts an error response procedure.

9. The method of claim 7, wherein if said receipt status information indicates incorrect receipt and said feedback response information indicates correct receipt, said receiver sends an error indication to said sender.

10. The method of claim 9, wherein the sending of the error indication is repeated more than once.

11. The method of claim 9, wherein said data unit is a given data unit among a sequence of data units to be sent from said sender to said receiver, and said error indication for said given data unit is sent together with error indications for other data units of said sequence.

12. The method of claim 9, wherein said sender, subsequent to receiving said error indication, retransmits said data unit.

13. The method of claim 1, wherein said sender includes the first to n-th feedback response information in one message that is sent to each of the plurality of n receivers.

14. The method of claim 1, wherein said data unit is a given data unit among a sequence of data units, and said sender, subsequent to receiving receipt status information for said given data unit indicating correct receipt at least one of said plurality of n receivers, sending a data unit further on in said sequence than said given data unit.

15. The method of claim 14, wherein said sender, subsequent to receiving receipt status information for said given data unit indicating correct receipt at least a threshold number k of said plurality of n receivers, k being an integer and $1<k\leq n$, disabling the sending of any receiver feedback response information related to the receipt status information of said given data unit.

16. The method of claim 15, wherein k=2.

17. The method of claim 14, wherein said sender includes the first to n-th feedback response information in one message that is sent to each of the plurality of n receivers, and where for each value of i from 1 to n, if the i-th receipt status information indicates incorrect receipt and the i-th feedback response information indicates correct receipt, and if the feedback response information associated with a threshold number j of the other receivers than the i-th receiver indicates incorrect receipt, j being an integer and $0<j<n$, said i-th receiver sends an error indication to said sender.

18. The method of claim 17, wherein j=n−1.

19. The method of claim 14, wherein for each value of i from 1 to n, if the i-th receipt status information indicates incorrect receipt and the i-th feedback response information indicates correct receipt, said i-th receiver sends an i-th error indication to said sender, and said sender retransmits said given data unit if it receives error indications from all of the receivers for which it sent feedback response information indicating a correct receipt.

20. A method of controlling a data unit sender in a transmission of a data unit to a receiver among a plurality of n receivers involved in a macro-diversity transmission, n being an integer larger than one, where for each value of i from 1 to n, the i-th receiver sends to said sender an i-th feedback message comprising receipt status information for said data unit indicating one of at least correct receipt and incorrect receipt at the i-th receiver, the method comprising the steps of:
sending said data unit to each of said plurality of n receivers, and
subsequent to receiving said i-th feedback message from said i-th receiver, sending to said i-th receiver i-th feedback response information indicating a receipt status indicated in said received i-th feedback message.

21. The method of claim 20, wherein said feedback response information is coded to be more resistant against transmission errors than said receipt status information.

22. The method of claim 20, wherein the sending of the feedback response information is repeated more than once.

23. The method of claim 20, wherein said feedback response information is sent in a dedicated feedback response message.

24. The method of claim 20, wherein said data unit is a given data unit among a sequence of data units to be sent from said sender to said receiver, and said feedback response information is sent in a different data unit of said sequence than said given data unit or in a retransmission of said given data unit.

25. The method of claim 20, wherein said data unit is a given data unit among a sequence of data units to be sent from said sender to said receiver, and said feedback response information for said given data unit is sent together with feedback response information for other data units of said sequence.

26. The method of claim 20, further comprising the step: subsequent to receiving an error indication from said receiver, retransmitting said data unit.

27. The method of claim 20, wherein the first to n-th feedback response information is included in one message that is sent to each of the plurality of n receivers.

28. The method of claim 20, wherein said data unit is a given data unit among a sequence of data units t and said sender, subsequent to receiving receipt status information for said given data unit indicating correct receipt at at least one of said plurality of n receivers t sending a data unit further on in said sequence than said given data unit.

29. The method of claim 28, wherein said sender, subsequent to receiving receipt status information for said given data unit indicating correct receipt at least a threshold number k of said plurality of n receivers, k being an integer and 1<k≦n, disabling the sending of any receiver feedback response information related to the receipt status information of said given data unit.

30. The method of claim 29, wherein k=2.

31. The method of claim 28, further comprising the step: subsequent to receiving one or more error indications from said plurality of n receivers, retransmitting said given data unit if error indications are received from all of the receivers for which the sender sent feedback response information indicating a correct receipt.

32. A non-transitory computer-readable medium encoded with a computer program that executes the method of claim 20 when loaded into and run on a programmable data unit sending device.

33. A method of controlling a data unit receiver in a macro-diversity transmission of a data unit from a sender to said receiver, comprising the steps:
subsequent to receiving said data unit, sending to said sender a feedback message comprising receipt status information for said data unit indicating one of at least correct receipt and incorrect receipt,
subsequent to receiving from said sender feedback response information indicating a receipt status indicated in said feedback message as received by said sender, determining whether said receipt status information and said feedback response information indicate the same receipt status.

34. The method of claim 33, wherein if said receipt status information and said feedback response information do not indicate the same receipt status, conducting an error response procedure.

35. The method of claim 33, wherein if said receipt status information indicates incorrect receipt and said feedback response information indicates correct receipt, sending an error indication to said sender.

36. The method of claim 35, wherein the sending of the error indication is repeated more than once.

37. The method of claim 35, wherein said data unit is a given data unit among a sequence of data units to be sent from said sender to said receiver, and said error indication for said given data unit is sent together with error indications for other data units of said sequence.

38. The method of claim 33, wherein said receiver is among a plurality of n receivers, n being an integer larger than one, further comprising the step:
subsequent to receiving from said sender first to n-th feedback response information respectively associated with the plurality of n receivers, and if the receipt status information associated with said receiver indicates incorrect receipt and the feedback response information associated with said receiver indicates correct receipt, and if the feedback response information associated with a threshold number j of the other receivers than said receiver indicates incorrect receipt, j being an integer and 0<j <n, said receiver sending an error indication to said sender.

39. The method of claim 38, wherein j=n−1.

40. A non-transitory computer-readable medium encoded with a computer program that executes the method of claim 33 when loaded into and run on a programmable data unit receiving device.

41. A data unit sender for transmitting a data unit to a receiver among a plurality of n receivers involved in a macro-diversity transmission, n being an integer larger than one, comprising:
a control system arranged for sending a data unit to each of said plurality of n receivers, and
subsequent to receiving an i-th feedback message sent from the i-th receiver, i being an integer from 1 to n, said i-th feedback message comprising receipt status information for said data unit indicating one of at least correct receipt and incorrect receipt at the i-th receiver, for sending to said i-th receiver
i-th feedback response information indicating a receipt status indicated in said received i-th feedback message.

42. A data unit receiver for receiving a data unit from a sender in a macro-diversity transmission, comprising: a control system arranged for sending to said sender a feedback message comprising receipt status information for said data unit indicating one of at least correct receipt and incorrect receipt, subsequent to receiving said data unit, and, subsequent to receiving from said sender feedback response information indicating a receipt status indicated in said feedback message as received by said sender, for determining whether said receipt status information and said feedback response information indicate the same receipt status.

* * * * *

UNITED STATES PATENT AND TRADEMARK OFFICE
CERTIFICATE OF CORRECTION

PATENT NO. : 8,219,867 B2
APPLICATION NO. : 12/064533
DATED : July 10, 2012
INVENTOR(S) : Meyer et al.

Page 1 of 1

It is certified that error appears in the above-identified patent and that said Letters Patent is hereby corrected as shown below:

In Fig. 2, Sheet 2 of 9, delete "  " and insert --  --, therefor.

In Fig. 5, Sheet 5 of 9, delete "  " and insert --  --, therefor.

In Column 7, Line 6, delete "sender" and insert -- receiver --, therefor.

In Column 7, Line 51, delete "at least" and insert -- at at least --, therefor.

In Column 8, Line 42, delete "at least" and insert -- at at least --, therefor.

In Column 8, Line 60, delete "at least" and insert -- at at least --, therefor.

In Column 12, Line 52, in Claim 15, delete "at least" and insert -- at at least --, therefor.

Signed and Sealed this
Sixth Day of November, 2012

David J. Kappos
*Director of the United States Patent and Trademark Office*